United States Patent [19]
Nichols

[11] Patent Number: 5,388,144
[45] Date of Patent: Feb. 7, 1995

[54] AUTOMATIC EMERGENCY DIALER

[76] Inventor: John D. Nichols, 1716 21st St., Anson, Tex. 79501

[21] Appl. No.: 119,538

[22] Filed: Sep. 13, 1993

[51] Int. Cl.6 .................... H04M 11/00; H04M 11/04
[52] U.S. Cl. ........................ 379/40; 379/39; 379/43
[58] Field of Search ............... 379/40, 38, 39, 41, 379/42, 43, 44, 45, 51

[56] References Cited

U.S. PATENT DOCUMENTS

| | | |
|---|---|---|
| 2,088,002 | 7/1937 | Scott ................................. 379/40 |
| 2,159,650 | 5/1939 | Alker ................................ 379/40 |
| 2,168,320 | 8/1939 | Brown ............................... 379/40 |
| 2,550,076 | 4/1951 | McCarron ........................ 379/40 |

*Primary Examiner*—Curtis Kuntz
*Assistant Examiner*—Stella L. Woo
*Attorney, Agent, or Firm*—Gary C. Honeycutt

[57] ABSTRACT

A simple, inexpensive device for automatically dialing an emergency number in response to a signal generated by a smoke alarm or other security system. The device includes a cam and cam follower, arranged in combination with an electrical switch connected to a telephone line, so that the motion of the cam follower causes the switch to create a dialing function without human intervention, and without electrical power, other than the dial-tone voltage from the telephone line.

4 Claims, 2 Drawing Sheets

AUTOMATIC EMERGENCY DIALER

This invention relates to an apparatus for automatically dialing an emergency phone number in response to a danger signal received from a security device, such as a smoke detector, a heat-sensing device, a motion-detector, or the like.

SUMMARY OF THE INVENTION

The importance of security systems, such as smoke alarms, has become universally known and accepted. However, an obvious disadvantage to the common smoke alarm is the simple fact that someone must hear the alarm and then react by dialing an emergency phone number. This invention makes the smoke alarm far more valuable by providing the alarm with a simple, inexpensive, built-in cability to dial an emergency number automatically, without any human intervention, and without a separate source of electric power. This eliminates the usual concern about periodic battery replacement.

Burglar alarms, including motion detectors for example, to protect homes and businesses have become increasingly popular. Many such systems are connected to a remote monitoring station manned 24 hours a day by personnel whose only function is to dial 9-1-1 and send the police whenever an alarm signal is received. This invention eliminates the need for a remote monitoring station by enabling a burglar alarm or other security system to automatically dial 9-1-1.

In a specific example, the device of the invention includes a cam-like member having a series of notches, recessed areas, or other irregular-shaped features in its perimeter, and a cam follower engaging said perimeter. The follower is connected to one or more electrical contacts, such that the motion imparted to the follower by the cam causes a contact to alternately close and open an electrical switch.

By connecting the switch to a telephone circuit, a dialing function is completed. The spacing of the notches, correlated with the rotation speed of the cam, determines the number to be dialed. For example, nine closely-spaced notches, followed by two widely-spaced notches, will cause 9-1-1 to be dialed, which is the most commonly used emergency number.

Preferably, the cam is spring-powered, so that the device requires no electrical power other than the dial-tone voltage supplied by the telephone circuit. Also, a battery can be provided to power the cam, and the battery can be recharged from the dial-tone current. Initially, the user sets the cam to a fully-wound position, where it is locked in place by a retainer, and held motionless until actuated by a signal received from a smoke alarm or other security device. For example, the retainer may be moved by a metallic rod or lever, and the smoke alarm signal may be connected to an electromagnet or solenoid placed near the rod, so that activation of the magnet moves the rod to a position that shifts the retainer and thereby releases the cam.

Figure 1:
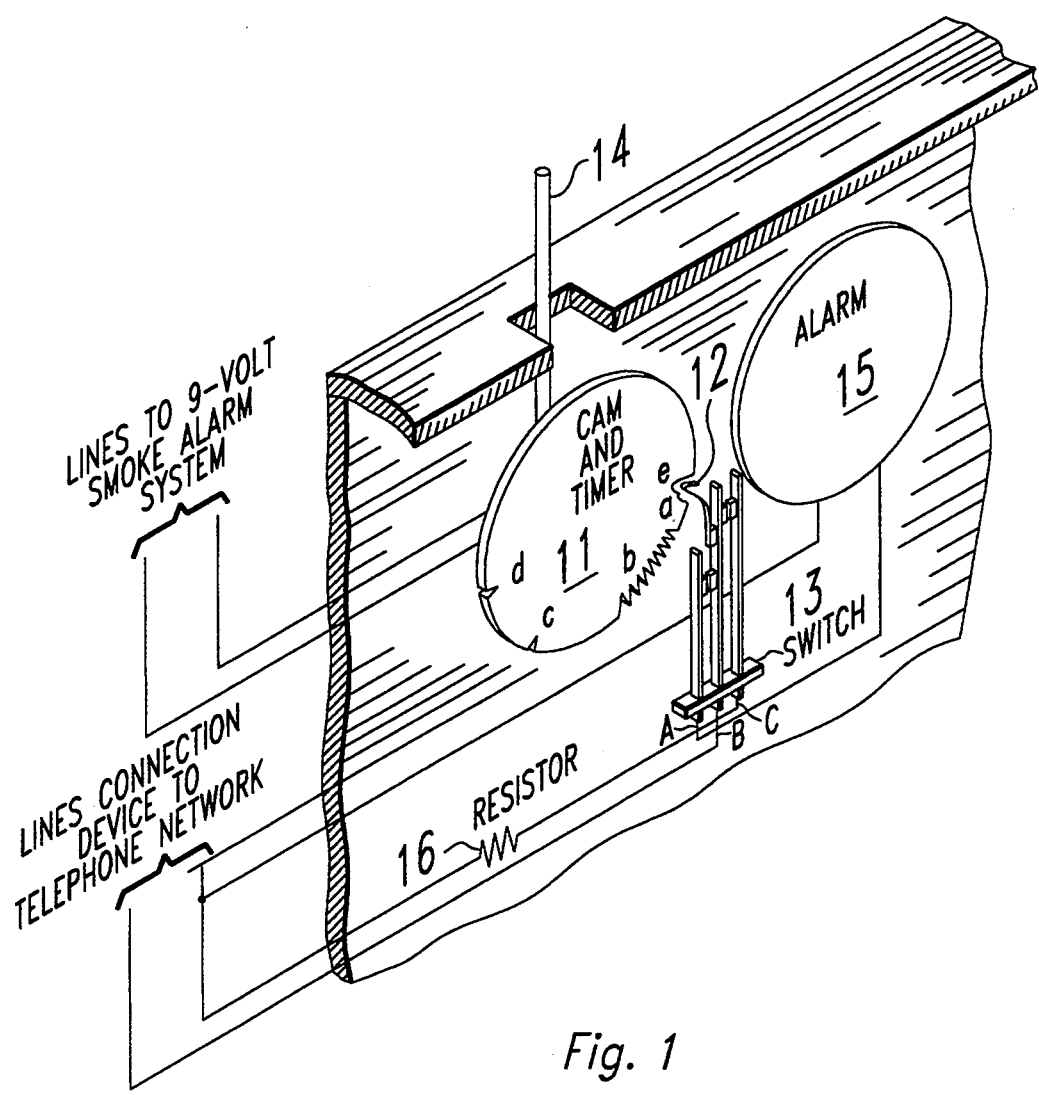
FIG. 1 is a partially cut-away plan view of one example of the device of the invention.

The embodiment of FIG. 1 includes cam 11 having notches a through d along its perimeter. The cam is mounted on a shaft for rotation about its center. Cam follower 12 is shown in its initial position, which corresponds to notch a of the cam. The other end of the follower is connected to the two central contacts of switch 13, such that follower motion in one direction causes contacts A-B to close, while motion in the other direction causes contacts B-C to close. Follower 12 appears to be "relaxed" as shown, without touching the cam, but such a position was selected only for clarity of illustration. Actually, the switch is constructed so that the central contact support will inherently move to the left position (A-B closed) when unrestrained by the follower.

When the cam is released, by disengaging retainer 14, it begins counter-clockwise rotation, which moves follower 12 to the outer perimeter of the cam and thereby closes contacts B-C of switch 13. This completes the circuit through resistor 16, and thereby simulates the removal of a telephone receiver from its cradle, so that dial-tone power is connected. As the cam turns, notches b engage the follower so that the B-C contacts are opened and closed 9 times, then held closed between notches b and c, then opened once by notch c and again once by notch d. The speed of the cam and the spacing of the notches are selected to generated a dialing signal on the phone line, whereby the emergency number 9-1-1 is dialed to automatically call the police.

After notch d, the outer perimeter of the cam causes the follower to hold contacts B-C in the closed position until notch e arrives, thereby allowing ample time for the 9-1-1 system to identify the origin of the call. Then, notch e allows the follower to move to the far left position, whereby contacts A-B are closed, so that incoming calls will activate optional alarm 15.

Figure 2:
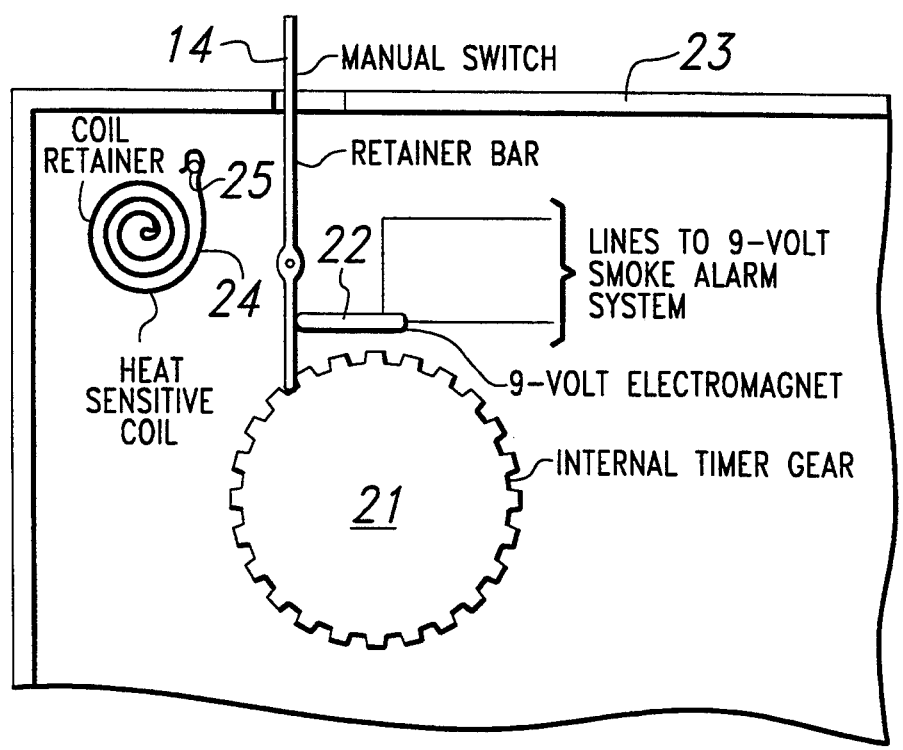
FIG. 2 is a partially cut-away plan view of another embodiment of the invention.

The embodiment of FIG. 2 is similar to the embodiment of FIG. 1, in that it also includes a cam, cam follower, and switch in the same relationship shown in FIG. 1. FIG. 2 more clearly illustrates the position of retainer 14 as it engages timing gear 21 to hold cam 11 motionless. Also illustrated is magnet 22 for disengaging retainer 14, responsive to a smoke alarm signal.

Manual operation of retainer 14 is also provided, by extending one end thereof through an opening in housing 23. Still further, the retainer can be disengaged by heat-sensitive coil 24, one end of which is hooked on peg 25. That is, when heated to a sufficiently high temperature, the coil expands, thereby forcing the hooked end to escape from peg 25 and impact retainer 14 with sufficient force to jar it loose from the timing gear, thereby actuating the timing system and cam 11.

What is claimed is:

1. A fail-safe system for automatically dialing an emergency telephone number in response to a danger signal, and for using a return telephone call to activate an alarm, comprising:

a cam-like member having a series of irregularities in its perimeter;

a cam follower engaging said perimeter;

electrical contacts controlled by the motion of said follower;

means connecting said contacts to a telephone line, including resistance means for simulating a telephone circuit;

means for actuating said cam-like member responsive to a danger signal, thereby causing the number of an emergency station to be dialed; and an alarm in combination with means for connecting said phone line to said alarm, subsequent to said dialing function, so that an incoming return call from the emergency station will energize said alarm.

2. Apparatus as in claim 1, wherein the speed of said cam and the spacing of said irregularities are selected to generate a dialing signal on the telephone line.

3. Apparatus as in claim 1 wherein said means for actuating the cam is responsive to a signal generated by a smoke detector.

4. Apparatus as in claim 1 wherein said means for actuating the cam includes a heat-sensitive coil that mechanically triggers release of the cam upon expanding from the elevated temperature caused by a fire.

* * * * *